Figure 1:
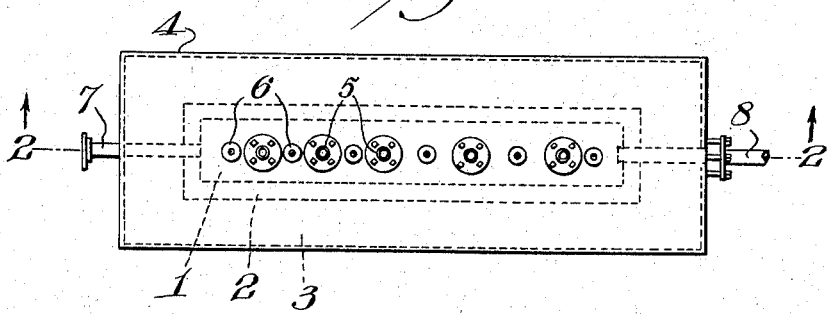
Figure 2:
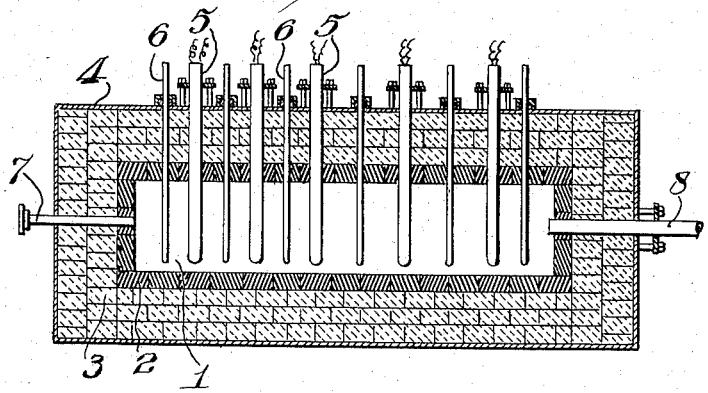

INVENTOR
*Frederick J. Gradishar*

BY *Frank C. Hilberg*

ATTORNEY

United States Patent Office 2,875,254
Patented Feb. 24, 1959

2,875,254

PROCESS FOR BROMINATING AND FLUORINATING HALOGENATED METHANES IN A REFRACTORY ALUMINA REACTION ZONE

Frederick J. Gradishar, Wilmington, Del., assignor to E. I. du Pont de Nemours and Company, Wilmington, Del., a corporation of Delaware Application January 13, 1954, Serial No. 403,772

6 Claims. (Cl. 260—653.8)

This invention relates to a new and useful process for carrying out the gas-phase halogenation of certain halogenated mono-hydromethanes. Heretofore, great difficulty has been encountered in manufacturing halogenated methane derivatives due to the corrosive nature of the reactants and products. This is especially true in the case of halogen substitution reactions in which a halogen atom replaces a hydrogen atom or another halogen atom in the halogenated methane. The reaction zone contains not only the molecular halogen reactant but also the hydrohalide acid which attacks silica-containing materials, such as glass, fused silica, and many other utensils that are normally considered chemically inert. Bromine, in particular, also offers many difficulties with respect to the apparatus in which its reactions are carried out since it is very corrosive and even attacks platinum. Fused alumina has shown good corrosive-resistant properties to reactions of this type, but it has serious limitations with respect to fabrication and is not available in a form which will provide gas-impervious walls of a size required for commercial operation.

It is an object of the present invention to provide a process for gas-phase reactions in which hot halogen gas and their corresponding hydroacids are encountered. Another object is the provision of an economical apparatus which may be readily fabricated to commercial installations. A still further object is a process for brominating certain halogenated methanes in a simple and economical manner with a minimum of contaminating substances, such as silica compounds and the like introduced by way of apparatus. Other objects will appear as the description of the invention proceeds.

These and other objects are accomplished by halogenating with particularly molecular bromine or a hydrogen halide, such as HBr or HF, a fluorinated methane having the formula $CYF_2X$ in which Y can be hydrogen or chlorine and X is any halogen, particularly chlorine, bromine or another fluorine. These reactions are carried out in a special apparatus which comprises essentially an insulated gas-impervious shell provided with an interior, relatively thin refractory alumina lining which covers the reaction chamber completely. Such a structure has been found to operate without significant corrosion at reaction zone temperatures as high as 900° C. and above. This is especially surprising in view of the fact that the thin alumina shield lining is permeable to the corrosive gases due both to its own porous properties and to the loose coupling between the construction units.

By the term "alumina" is meant any ceramic material containing at least 90% alumina. The refractory alumina particles comprising the construction unit may be united by fusion or compacted by any other known method. Fillers and binders, which may also be fusible, such as silica, talc, manganese oxide and the like, may be incorporated.

The structure embodying the novel, inventive features of this apparatus is illustrated in Figures I and II.

Figure I is a top plan view. Figure II is a sectional elevation taken on the line 2—2 of Figure I.

With reference to the figures, the operation of the apparatus involves a gas flow from the inlet tube 7 to the outlet tube 8 through the reaction chamber 1. The reaction chamber consists of a lining 2 of alumina brick. This is surrounded by several layers of thermally insulating fire clay brick 3. Insulating "Alundum" brick may be used for the lining 2 in which case the fire clay brick can be eliminated. The gas-impervious shell 4 encloses the entire structure. An internal electric heating element in a fused-alumina thimble 5 is provided. While the invention has been illustrated by electrically-heated tubes it is to be understood that these may be replaced by tubes heated by hot gases, reverse flames and the like. They may also extend through the bottom of the chamber and heated by direct flame combustion within the tube. Electrical heating, however, eliminates considerable construction difficulties and contaminations, and therefore, is preferred. Thermocouples encased in fused-alumina tubes 6 may be used to observe the conditions of the reaction.

The fused-alumina thimble encasing heating element 5 is available from commercial sources. Since in the structure, as described, it is isolated from the internal containing walls and is insulated from them to some extent during normal operations in continuous processes by the flow of gases, it is obvious that in such processes the gases immediately in contact with the heating element can be raised to a temperature in excess of that experienced at the containing wall. This structure obviates the necessity of heating the containing walls to the high temperatures necessary to effect a corresponding gas temperature rise in conventional externally-heated reactors. Heat losses, inherent in externally-heated reactors, due to the thermal resistance of the containing walls are avoided. Furthermore, the presence of the protruding heat elements and their connecting and insulating accouterments provide increased agitation to the flowing gases thereby assisting in their more intimate contact. It is obvious, therefore, that when centrally heated as illustrated, the apparatus is especially valuable in high-temperature, continuous reactions involving halide gases.

The internal shield lining is composed of a relatively thin layer of alumina. This may be conveniently formed by laying commercially available, fused-alumina bricks or other bricks of high alumina content in alumina cement. The size of the brick is not important. It is only essential that it provide sufficient baffling to prevent direct flow of hot halide gas against the surface of the thermally-insulating fire clay layer. Fused-alumina brick, 9"x4½"x2½", laid so as to provide a wall of 2½ inches is considered satisfactory.

The fire clay layer acts primarily as a thermal insulator. While normally such material is porous to a certain extent, it has been found essentially unaffected by the lining stagnated halogen and halide gases of the reactor even at temperatures as high as 900° C. This layer should be thick enough to provide sufficient thermal insulation so that the gas-impervious casing will be maintained below temperatures at which it is substantially attacked by the contained gases. This thickness will, therefore, primarily vary according to the temperature which is to be used within the reactor. By "fire clay" is meant a refractory clay containing large proportions of silica and alumina in comparison with the basic oxides. Bricks of such material, commonly known as fire bricks, are convenient construction units for this layer. However, the form and size of the layer is not critical provided the thermal insulation is accomplished. Thermal insulation can also be accomplished by use of insulating alumina bricks such as type TA 5058 Norton "Alundum" insulating brick.

When using this brick or the conventional fire brick, a thickness of 7 to 10 inches is considered adequate for reaction temperatures from about 500 to 900° C.

The gas impervious shell is employed to seal the somewhat porous fire clay insulator. Its material of construction is not critical but metals are normally used. Since some halide gases frequently penetrate the siliceous insulator it must be sealed with a material non-corrosive at whatever lower temperature is obtained by the thermal insulation. Many materials are essentially non-corrosive at these lower temperatures to the halide gases encountered. For reactors wherein the outside wall of the insulator is about 100° C. or less, steel is satisfactory. For higher temperatures, for instance around 400° C., a more corrosion-resistant metal is necessary, such as nickel or Monel. However, other gas-impervious materials, for instance, synthetic plastics, such as polytetrafluoroethylene, may be used, especially at lower temperatures. Steel is preferred because of its cost advantage and ease of fabrication.

The size and shape of the structure is not critical. The reacting gases may be made to flow a tortuous path. The cross-sectional area of the reaction chamber may vary so as to subject the flow of gases to velocity variations. The number and spacing of heating elements may be varied. Instead of the bayonet-type heater suspended perpendicular to the reaction chamber walls, as illustrated, one or several heaters may be mounted parallel to and out of contact with the chamber walls. The inlet and outlet tubes may be of fused alumina, nickel or the like. Since replacement of this element is comparatively simple, the effect of corrosion upon it is not of any considerable consequence.

As indicated above, the outside shell may be nickel in place of steel. A particularly effective reactor of this type is constructed to provide a reaction chamber of about 15" x 10" x 60" which is lined to a thickness of about 10" with standard type 9" "Alundum" insulating brick set in "Alundum" cement and being provided with a 2" inlet and outlet tube at either end. These tubes are also made of "Alundum" and care is taken that the entire inner surface of the reaction chamber is provided with a thin layer of "Alundum." Five heating elements are suspended as shown in the drawing.

The following examples are cited by way of illustration and are not intended to limit the invention in any manner.

*Example I*

A steel shell reactor is constructed to provide a reaction chamber about 15 x 10 x 60 inches which is lined to a thickness of about 2½ inches with fused-alumina bricks set in alumina cement and thermally insulated from the steel shell with about 8 inches of fire brick, having 2-inch inlet and outlet tubes of alumina at either end. Five heating elements are suspended in alumina thimbles along the course of flow in bayonet fashion. The reaction chamber is heated to a temperature of 655–680° C.

Vaporized bromine is fed in at a rate of 52 pounds per hour along with trifluoromethane at the rate of 29 pounds per hour. A contact period of temperature of 3.6 seconds is obtained. Bromotrifluoromethane is produced at the rate of 40 pounds per hour. By-products include approximately 0.6 pound per hour of hydrofluoric acid.

*Example II*

Using the equipment of Example I, vaporized bromine is fed into the inlet at a rate of 12½ pounds per hour along with 27½ pounds per hour of bromodifluoromethane. A contact time of 13.5 seconds is provided for the gases at temperatures of 460–500° C. from inlet to outlet. The effluent contains 15.5 pounds per hour of dibromodifluoromethane, excess reactants and hydrofluoric acid by-product.

*Example III*

Employing the apparatus described in Example I, hydrogen bromide is pumped in at a rate of 12 pounds per hour along with 18 pounds per hour of chlorodifluoromethane. A contact time of 9.5 seconds is provided at temperatures ranging from 560–595° C. from inlet to outlet. Six and eight-tenths (6.8) pounds per hour of bromodifluoromethane is produced. Hydrofluoric acid is identified among the by-products.

*Example IV*

A mixture comprised of 17.7 lbs./hr. of monochlorodifluoromethane and 32.5 lbs./hr. of bromine were fed to the apparatus of Example I and reacted at 490–500° C. with a contact time of 8.8 seconds. The conversions were 75% and 76% for the monochlorodifluoromethane and bromine respectively. The resulting stream from the reactor had the following organic composition: 25% monochlorodifluoromethane, 71% monochloromonobromodifluoromethane, 1% monobromodifluoromethane, 2% dibromodifluoromethane and 1% dichlorodifluoromethane. The production rate was 24.3 lbs./hr. of monochloromonobromodifluoromethane.

*Example V*

Vaporized bromine is fed in at a rate of 24.7 pounds per hour along with monochlorodifluoromethane at the rate of 14.3 pounds per hour. A contact period of 9.2 seconds is obtained and conversion of about 82% for monochlorodifluoromethane and about 87% for bromine are realized. The resulting stream from the reactor has the following organic composition: 18% of monochlorodifluoromethane, 75.5% of monochloromonobromodifluoromethane, 2% of dibromodifluoromethane and 0.5% of dichlorodifluoromethane. The production rate of monochloromonobromodifluoromethane is 20.6 pounds per hour.

Many other reactions wherein halide gases, as defined above, present high-temperature corrosion problems, may be carried out in this equipment. Among these may be mentioned the pyrolysis of chlorodifluoromethane to tetrafluoroethylene, the pyrolysis of difluoroethane to vinyl fluoride, the pyrolysis of carbon tetrachloride to tetrachloroethylene and the like. Where a catalyst is necessary, it may conveniently be packed in the reaction chamber in the form of pellets, through which the reacting gases must pass. For instance, tetrafluoromethane may be conveniently produced in this equipment by packing it with chromium fluoride pellets and passing through a mixture of chlorotrifluoromethane and hydrofluoric acid at about 900° C. Pressure, where desired, may be applied to the reactants and is limited by the strength of the gas-impervious shell.

*Example VI*

A chromium fluoride catalyst, containing 10% by weight of $CrF_3$, is prepared by mixing a slurry of 70 parts of $CrF_3 \cdot 3H_2O$ and 310 parts of absolute ethanol with 420 parts of 4 to 8 mesh activated carbon and the alcohol is removed from the catalyst by heating at 220–230° C. for two hours under 3 mm. Hg pressure. This catalyst is placed in the reactor described in Example I and is heated to 880° C. A mixture of anhydrous HF and $CF_3Cl$ is passed through the reactor at atmospheric pressure in the molar ratio of 3.1:1, at a contact time of approximately 11 to 12 seconds. The off-gases are washed with water at 25° C., passed through soda-lime and anhydrous calcium chloride, and finally are condensed at liquid temperature. On analysis, the condensate has the following composition:

Compound: Percent by weight
CF$_4$ ———————————————— 88.5
CF$_3$Cl ——————————————— 11.5

By recycling the CF$_3$Cl, a CF$_4$ yield approaching 100% is obtained.

*Example VII*

A mixture of anhydrous HF and CCl$_2$F$_2$ vapor in the ratio 3.5:1 is passed over a chromium fluoride catalyst, prepared as in the above example, and maintained at 900° C. The time of contact with the catalyst is about 16 to 17 seconds. The gases, collected as in the above example, have the following composition:

Compound: Percent by weight
CF$_4$ ———————————————— 96.6
CF$_3$Cl ——————————————— 3.4

Frequent inspection through the heating unit wells has failed to disclose any sign of deterioration due to corrosion in the reaction chamber even after continuous operation for several months.

Many other equivalent modifications within the scope of the invention will be apparent to those skilled in the art without a departure from the inventive concept.

It is apparent that many widely different embodiments of this invention may be made without departing from the spirit and scope thereof, and therefore, it is not intended to be limited except as indicated in the appended claims.

I claim:

1. The process of halogenation, in which a member of the group consisting of bromine, HBr and HF is reacted with a fluorinated methane having the formula CYF$_2$X in which Y is a member of the group consisting of hydrogen and chlorine and X is a halogen of the group consisting of chlorine, bromine and fluorine, which comprises bringing the reactants together and heating them to a temperature between about 440° C. and 900° C. in a reaction zone defined by solid surfaces which consist of refractory alumina.

2. The process of claim 1 in which the reactants are CHF$_3$ and bromine and the reaction is maintained at about 655° C.–680° C.

3. The process of claim 1 in which the reactants are CHBrF$_2$ and bromine and the reaction is maintained at about 440° C.–475° C.

4. The process of claim 1 in which the reactants are CHClF$_2$ and hydrobromic acid and the reaction is maintained at about 560° C.–595° C.

5. The process of claim 1 in which the reactants are CHClF$_2$ and bromine and the reaction is maintained at about 440° C.–500° C.

6. The process of claim 1 in which the product is CF$_4$ and the reactants are CCl$_2$F$_2$ and HF and the reaction is carried out in the presence of a chromium fluoride catalyst at a temperature of about 900° C.

References Cited in the file of this patent

UNITED STATES PATENTS

| | | |
|---|---|---|
| 2,005,711 | Daudt et al. | June 18, 1935 |
| 2,104,695 | Gleave | Jan. 4, 1938 |
| 2,110,369 | Leicester | Mar. 8, 1938 |
| 2,146,354 | Shever | Feb. 7, 1939 |
| 2,147,551 | Saives | Feb. 14, 1939 |
| 2,443,630 | McBee et al. | June 28, 1948 |
| 2,458,551 | Benning et al. | Jan. 11, 1949 |
| 2,521,207 | Eaton et al. | Sept. 5, 1950 |
| 2,639,301 | Ruh et al. | May 9, 1953 |
| 2,644,845 | McBee | July 7, 1953 |
| 2,658,086 | Ruh et al. | Nov. 3, 1953 |
| 2,658,928 | Simons et al. | Nov. 10, 1953 |
| 2,714,618 | Woolf | Aug. 2, 1955 |
| 2,729,687 | Sterling | Jan. 3, 1956 |

OTHER REFERENCES

Geller: "Nucleonics," vol. 7, No. 4, October 1950, pages 3 to 17 (pages 10 and 11 only relied on).